United States Patent
Strutt et al.

(10) Patent No.: US 11,780,021 B2
(45) Date of Patent: Oct. 10, 2023

(54) COMPONENT WITH STRUCTURED PANEL(S) AND METHODS FOR FORMING THE COMPONENT

(71) Applicant: Rohr, Inc., Chula Vista, CA (US)

(72) Inventors: Andrew J. Strutt, San Diego, CA (US); Joseph R. Lundin, New Braunfels, TX (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/472,073

(22) Filed: Sep. 10, 2021

(65) Prior Publication Data
US 2023/0083048 A1    Mar. 16, 2023

(51) Int. Cl.
*B23K 1/00*        (2006.01)
*B23K 1/20*        (2006.01)
*B23K 101/00*    (2006.01)

(52) U.S. Cl.
CPC .............. *B23K 1/0008* (2013.01); *B23K 1/20* (2013.01); *B23K 2101/006* (2018.08)

(58) Field of Classification Search
CPC ....... B32B 2605/18; B32B 3/12; B32B 3/266; B32B 3/04; B32B 15/043; B23K 1/0008; B23K 1/0014; B23K 1/0018; B23K 1/19; B23K 20/023
See application file for complete search history.

(56) References Cited

U.S. PATENT DOCUMENTS

| | | | |
|---|---|---|---|
| 2,656,160 A * | 10/1953 | Lyerly | F28F 3/02 165/170 |
| 3,071,853 A * | 1/1963 | Price | B21D 47/00 228/221 |
| 3,549,468 A * | 12/1970 | Yoshino | B23K 1/0014 428/117 |
| 3,890,108 A | 6/1975 | Welsh | |
| 4,564,547 A | 1/1986 | Hughes | |
| 5,680,934 A | 10/1997 | Jaegers | |
| 6,180,932 B1 | 1/2001 | Matsen | |
| 6,199,742 B1 | 3/2001 | Good | |
| 6,241,184 B1 | 6/2001 | Sunne | |
| 7,416,363 B2 * | 8/2008 | Kozhuev | F16B 5/008 52/592.1 |
| 7,785,098 B1 | 8/2010 | Appleby | |

(Continued)

FOREIGN PATENT DOCUMENTS

CN        111361236 A      7/2020

OTHER PUBLICATIONS

Sun Zhi et al. "On Compressive Properties of Composite Sandwich Structures with Grid Reinforced Honeycomb Core", Composites Part B, vol. 94, Mar. 26, 2016, pp. 245-252.

(Continued)

*Primary Examiner* — Erin B Saad
(74) *Attorney, Agent, or Firm* — Getz Balich LLC

(57) ABSTRACT

A manufacturing method is provided during which a plurality of first apertures are formed in a first plate to provide an apertured first plate. A plurality of second apertures are formed in a second plate to provide an apertured second plate. The apertured first plate and the apertured second plate are bonded to a base sheet to form a structure. The base sheet is bent to form a bend in the structure between the apertured first plate and the apertured second plate.

15 Claims, 9 Drawing Sheets

(56) References Cited

U.S. PATENT DOCUMENTS

| | | | | |
|---|---|---|---|---|
| 8,042,315 | B2 | 10/2011 | Ashton | |
| 8,834,667 | B2 * | 9/2014 | McCarville | B29C 66/547 |
| | | | | 156/304.6 |
| 9,114,587 | B2 * | 8/2015 | Lewis | B32B 3/04 |
| 9,206,309 | B2 * | 12/2015 | Appleby | B29C 33/3835 |
| 9,908,283 | B2 * | 3/2018 | Young | B29C 53/063 |
| 10,507,931 | B2 * | 12/2019 | Soria | B32B 7/12 |
| 2008/0179448 | A1 * | 7/2008 | Layland | H05B 3/28 |
| | | | | 244/1 N |
| 2008/0230590 | A1 * | 9/2008 | Takahashi | B23K 1/19 |
| | | | | 228/193 |
| 2009/0110879 | A1 * | 4/2009 | Lewis | B32B 3/04 |
| | | | | 428/137 |
| 2010/0247849 | A1 * | 9/2010 | Depaoli | B32B 21/13 |
| | | | | 428/116 |
| 2013/0071612 | A1 * | 3/2013 | Lewis | B32B 3/04 |
| | | | | 428/136 |
| 2014/0077031 | A1 * | 3/2014 | Benedetti | B32B 15/01 |
| | | | | 428/603 |
| 2015/0041059 | A1 * | 2/2015 | Olson | B32B 37/12 |
| | | | | 156/60 |
| 2015/0101738 | A1 * | 4/2015 | Young | E04C 2/365 |
| | | | | 156/443 |
| 2017/0297729 | A1 * | 10/2017 | Soria | B32B 27/08 |
| 2020/0338851 | A1 | 10/2020 | Switzer | |

OTHER PUBLICATIONS

EP search report for EP22195233.6 dated Dec. 23, 2022.

* cited by examiner

COMPONENT WITH STRUCTURED PANEL(S) AND METHODS FOR FORMING THE COMPONENT

BACKGROUND

1. Technical Field

This disclosure relates generally to a component with one or more structured panels.

2. Background Information

A component for an aircraft may be configured with an orthogrid structure or an isogrid structure. Various types of orthogrid and isogrid structures and method for manufacturing such structures are known in the art. While these known structures and manufacturing methods have various advantages, there is still room in the art for improvement. For example, a typical orthogrid or isogrid structure is formed by milling away pockets in a billet of material. Such a milling process can be time consuming and expensive.

SUMMARY OF THE DISCLOSURE

According to an aspect of the present disclosure, a manufacturing method is provided during which a plurality of first apertures are formed in a first plate to provide an apertured first plate. The apertured first plate is configured from or otherwise includes first plate metal. A plurality of second apertures are formed in a second plate to provide an apertured second plate. The apertured second plate is configured from or otherwise includes second plate metal. The apertured first plate and the apertured second plate are bonded to a base sheet to form a structure. The base sheet is configured from or otherwise includes base sheet metal. The base sheet is bent to form a bend in the structure between the apertured first plate and the apertured second plate.

According to another aspect of the present disclosure, another manufacturing method is provided during which an apertured first plate is provided that includes a plurality of first apertures. A base sheet is provided. The apertured first plate is brazed to the base sheet to form a first grid structure. The first apertures extend through the apertured first plate to the base sheet. The base sheet is bent along a first edge of the apertured first plate.

According to still another aspect of the present disclosure, an apparatus is provided that includes a first orthogrid structure and a second orthogrid structure. The first orthogrid structure includes an apertured first plate bonded to a first section of a non-apertured base sheet. A plurality of first apertures extend through the apertured first plate to the first section of the non-apertured base sheet. The second orthogrid structure includes an apertured second plate bonded to a second section of the non-apertured base sheet. A plurality of second apertures extend through the apertured second plate to the second section of the non-apertured base sheet. The first orthogrid structure is angularly offset from the second orthogrid structure by an included angle. The first orthogrid structure and the second orthogrid structure are each configured from or otherwise include metal.

The first grid structure may be configured as or otherwise include an orthogrid structure.

The manufacturing method may also include providing an apertured second plate that includes a plurality of second apertures. The apertured second plate may be brazed to the base sheet to form a second grid structure. The second apertures may extend through the apertured second plate to the base sheet. The bending may also include bending the base sheet along a second edge of the apertured second plate. The second edge of the apertured second plate may be bonded to the first edge of the apertured first plate.

The bonding may include brazing the apertured first plate and the apertured second plate to the base sheet.

The manufacturing method may also include welding the apertured first plate to the base sheet prior to brazing the apertured first plate to the base sheet. The manufacturing method may also or alternatively include welding the apertured second plate to the base sheet prior to brazing the apertured second plate to the base sheet.

The apertured first plate and the apertured second plate may be concurrently bonded to the base sheet.

The manufacturing method may also include arranging the apertured first plate and the apertured second plate with the base sheet. The arranging may include locating the apertured first plate relative to the apertured second plate using a spacer. The spacer may be disposed between and abutted against the apertured first plate and the apertured second plate during the locating.

The spacer may be removed prior to the bonding.

The apertured first plate may be welded to the apertured second plate following the bending of the base sheet.

The manufacturing method may also include bonding a chamfered first edge of the apertured first plate to a chamfered second edge of the apertured second plate following the bending of the base sheet.

A channel may be formed by and between the base sheet, the apertured first plate and the apertured second plate along the bend in the structure.

The forming of the first apertures may include machining the first apertures into the first plate. The forming of the second apertures may also or alternatively include machining the second apertures into the second plate.

The manufacturing method may also include: arranging bonding material between the apertured first plate and the base sheet and between the apertured second plate and the base sheet to provide one or more stacks; and pressing the one or more stacks between a first die and a second die during the bonding.

The apertured first plate may be angularly offset from the apertured second plate by an angle. This angle may equal to or greater than ninety degrees (90°) and less than one-hundred and eighty degrees (180°).

The apertured first plate and the base sheet may form a first orthogrid structure. The apertured second plate and the base sheet may also or alternatively form a second orthogrid structure.

A first of the first apertures may have a polygonal cross-sectional geometry. A first of the second apertures may have a polygonal cross-sectional geometry.

The structure may include a base, a plurality of first stiffening ribs and a plurality of second stiffening ribs. The base may be formed by the base sheet. The first stiffening ribs may be connected to and may project out from the base. The first stiffening ribs may be arranged in a first interconnected network that is formed by the apertured first plate. The second stiffening ribs may be connected to and may project out from the base. The second stiffening ribs may be arranged in a second interconnected network that is formed by the apertured second plate.

The manufacturing method may also include: forming a plurality of third apertures in a third plate to provide an apertured third plate; further bonding the apertured third plate to the base sheet to form the structure; and bending the base sheet to form a second bend in the structure between the apertured second plate and the apertured third plate. The apertured third plate may be configured from or otherwise include third plate metal.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
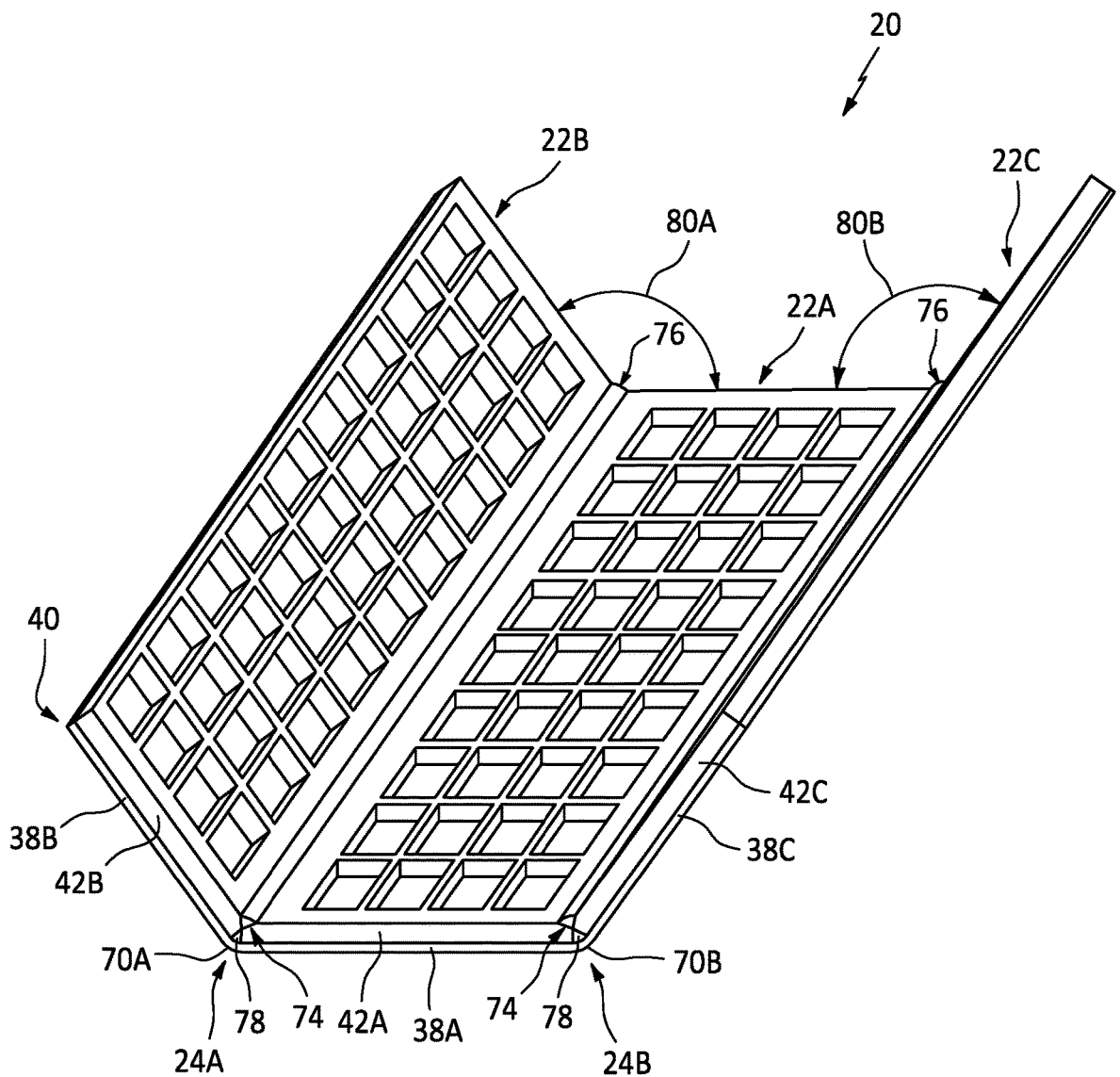
FIG. 1 is a perspective illustration of a component.

FIG. 1 illustrates a structural component 20 of an aircraft. The component 20, for example, may be configured as a part of an aircraft propulsion system, an aircraft fuselage, an aircraft wing, an aircraft pylon, an aircraft tail section, etc. Examples of the aircraft include, but are not limited to, an airplane, a helicopter, a drone, a rocket, or any other device which travels through air and/or space. The present disclosure, however, is not limited to aircraft applications.

The component 20 of FIG. 1 includes one or more component panels 22A-C (generally referred to as "22"). The intermediate component panel 22A and the first side component panel 22B of FIG. 1 are interconnected together at a first bend 24A; e.g., a corner, a crease, etc. The intermediate component panel 22A and the second side component panel 22C of FIG. 1 are interconnected together at a second bend 24B; e.g., a corner, a crease, etc.

Figure 2:
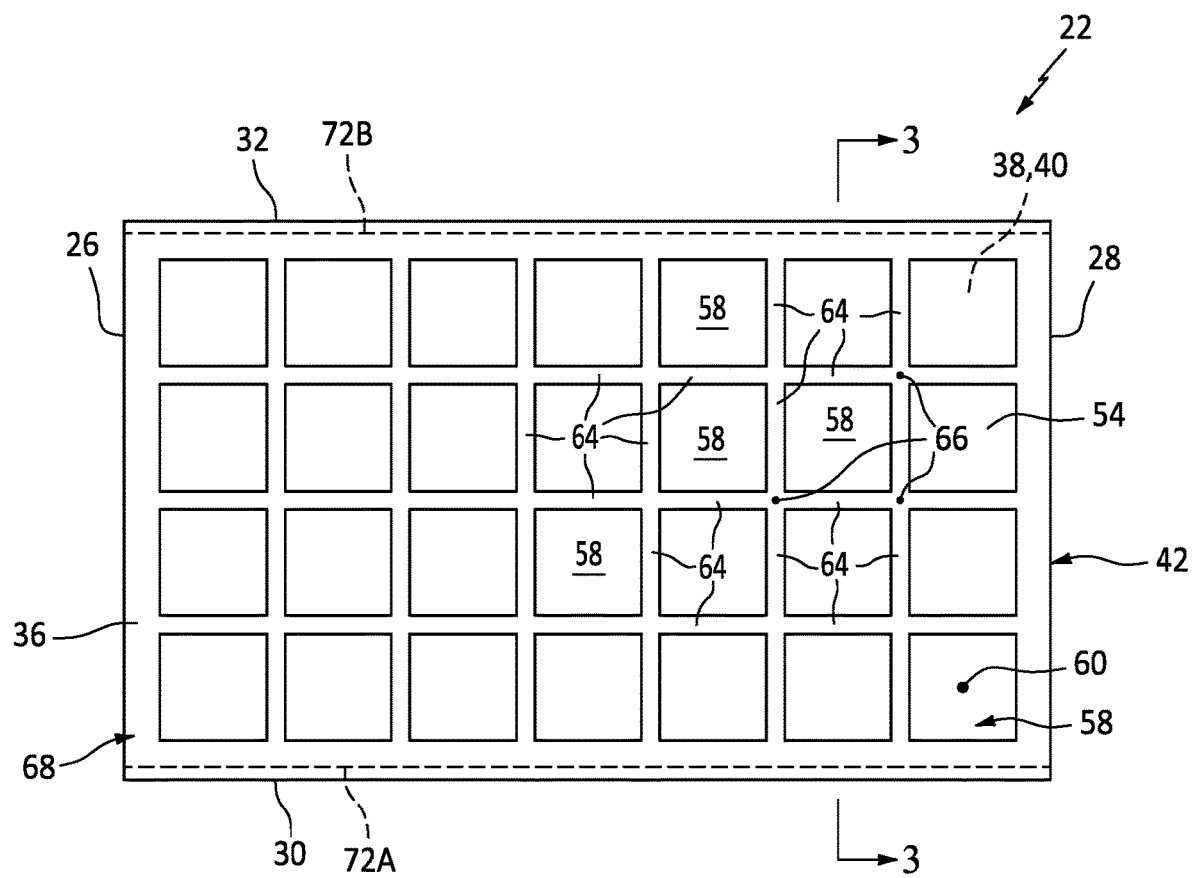
FIG. 2 is an illustration of a component panel.
Figure 3:
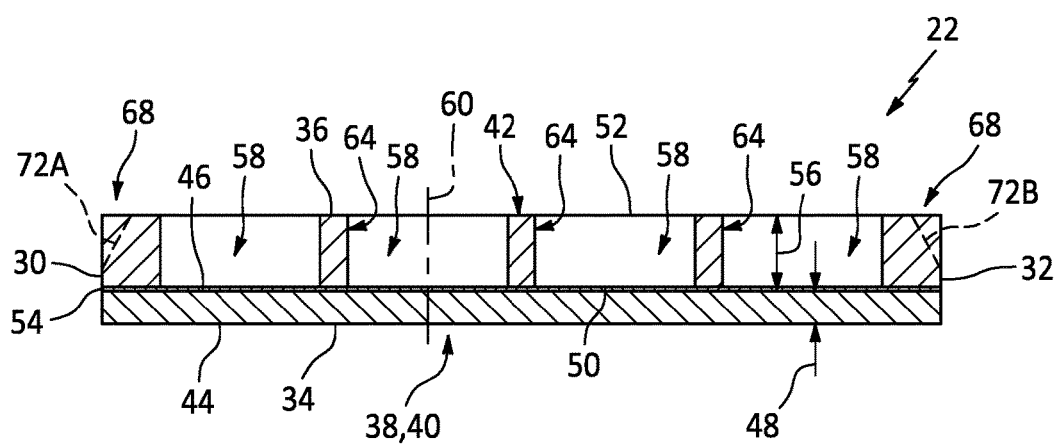
FIG. 3 is a sectional illustration of the component panel taken along line 3-3 in FIG. 2.

Referring to FIG. 2, each of the component panels 22 extends longitudinally between and to a longitudinal first end 26 of the respective component panel 22 and a longitudinal second end 28 of the respective component panel 22. Each component panel 22 extends laterally between and to a lateral first end 30 of the respective component panel 22 and a lateral second end 32 of the respective component panel 22. Referring to FIG. 3, each component panel 22 extends vertically between and to a vertical first side 34 of the respective component panel 22 and a vertical second side 36 of the respective component panel 22.

Each component panel 22 of FIGS. 2 and 3 is configured as a structural/structured panel. Each component panel 22, for example, may be configured as or otherwise include an orthogrid structure. The present disclosure, however, is not limited to such an exemplary component panel configuration. One or more or all of the component panels 22, for example, may alternatively each be configured as or otherwise include an isogrid structure or any other type of grid structure.

Each component panel 22 may have a multi-layered construction. Each component panel 22 of FIG. 1, for example, includes a respective base section 38A, B, C (generally referred to as "38") of a solid, non-apertured sheet 40 (referred to below as a "base sheet") and a respective apertured plate 42A, B, C (generally referred to as "42").

Referring to FIGS. 2 and 3, the base sheet 40 and its respective base section 38 are disposed at the panel first side 34. The base sheet 40 and its respective base section 38 of FIGS. 2 and 3 form a skin of the respective component panel. The base sheet 40 and its respective base section 38 may be constructed from a solid, non-apertured sheet of material; e.g., sheet metal. The base sheet material may be metal such as, but not limited to, nickel (Ni), titanium (Ti), or any of their respective alloys.

Referring to FIG. 2, the base sheet 40 and its respective base section 38 extend longitudinally between and to (or about) the longitudinal first end 26 of the respective component panel 22 and the longitudinal second end 28 of the respective component panel 22. The respective base sheet base section 38 extends laterally between and to (or about) the lateral first end 30 of the respective component panel 22 and the lateral second end 32 of the respective component panel 22. Referring to FIG. 3, the base sheet base section 38 extends vertically between and to opposing vertical side surfaces 44 and 46 of the respective base sheet base section 38, where the first side surface 44 of the base sheet base section 38 is disposed at the panel first side 34.

The base sheet base section 38 has a vertical thickness 48. This vertical thickness 48 extends from the first side surface 44 of the respective base sheet base section 38 to the second side surface 46 of the respective base sheet base section 38.

The apertured plate 42 is disposed at the panel second side 36. The apertured plate 42 of FIGS. 2 and 3 forms a reinforcement and/or support structure for the panel skin. The apertured plate 42 may be constructed from an apertured sheet of material; e.g., sheet metal or metal plate. The apertured plate material may be metal such as, but not limited to, nickel (Ni), titanium (Ti), or any of their respective alloys. The apertured plate material may be the same as the base sheet material.

Referring to FIG. 2, the apertured plate 42 extends longitudinally between and to (or about) the longitudinal first end 26 of the respective component panel 22 and the longitudinal second end 28 of the respective component panel 22. The apertured plate 42 extends laterally between and to (or about) the lateral first end 30 of the respective component panel 22 and the lateral second end 32 of the respective component panel 22. Referring to FIG. 3, the apertured plate 42 extends vertically between and to opposing vertical side surfaces 50 and 52 of the apertured plate 42, where the second side surface 52 of the apertured plate 42 is disposed at the panel second side 36. The first side surface 50 of the apertured plate 42 is abutted vertically against and engages the second side surface 46 of the base sheet 40 and its respective base section 38. The apertured plate 42 of FIG. 3, for example, is bonded to the base sheet base section 38 by bonding material 54; e.g., braze material and/or weld.

The apertured plate 42 has a vertical thickness 56. This vertical thickness 56 extends from the first side surface 50 of the apertured plate 42 to the second side surface 52 of the apertured plate 42. The vertical thickness 56 of FIG. 3 is sized differently (e.g., greater) than the vertical thickness 48 of the respective base sheet base section 38. The present disclosure, however, is not limited to such an exemplary dimensional relationship.

The apertured plate 42 includes a plurality of apertures 58; e.g., ports, windows, etc. These apertures 58 may be configured as through-apertures relative to the apertured plate 42, and as blind-apertures relative to the respective component panel. Each of the apertures 58, for example, extends along a respective aperture centerline 60 vertically through the apertured plate 42 between and to the first side surface 50 and the second side surface 52 of the apertured plate 42. Each aperture 58 of FIG. 3 thereby projects vertically into the respective component panel 22 from the panel second side 36, through the apertured plate 42, to the respective base sheet base section 38 and its second side surface 46 (and/or the bonding material 54 over the second side surface 46).

Figure 4A:
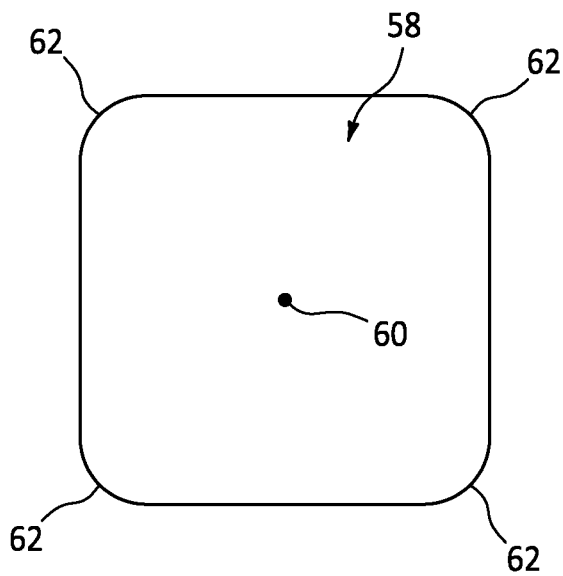
FIGS. 4A and 4B are schematic illustrations of various aperture configurations for the component panel.
Figure 4B:
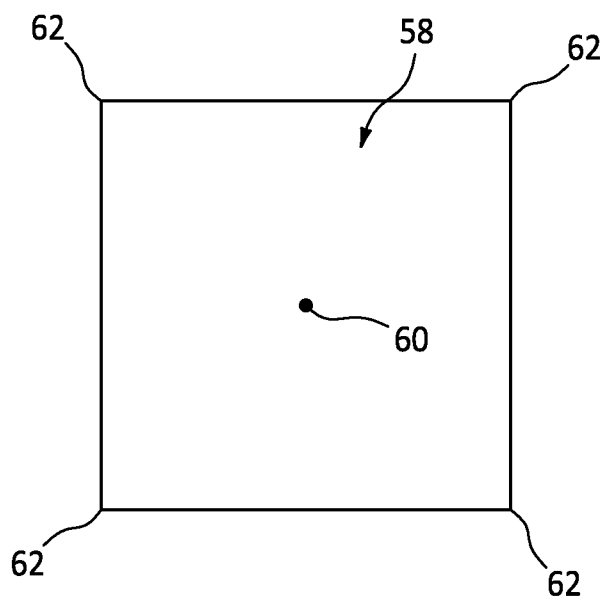

Referring to FIG. 2, each of the apertures 58 has a cross-sectional geometry when viewed, for example, in a plane perpendicular to its aperture centerline 60 and/or a plane parallel with one or more of the surfaces 44, 46, 50 and/or 52 (see also FIG. 3). The cross-sectional geometry may be a polygonal cross-sectional geometry; e.g., a rectangular cross-sectional geometry, a diamond-shaped cross-sectional geometry, a triangular cross-sectional geometry, etc. Referring to FIG. 4A, one or more or all of corners 62 of the polygonal cross-sectional geometry may be eased; e.g., rounded. Referring to FIG. 4B, one or more or all of the corners 62 of the polygonal sectional geometry may alternatively (or also) be sharp; e.g., pointed, squared-off.

Referring to FIG. 2, the apertures 58 are arranged in an array. This array may have a rectangular pattern with one or more laterally extending rows and one or more longitudinally extending columns. The present disclosure, however, is not limited to such an exemplary pattern.

With the foregoing arrangement, the respective component panel 22 is configured with an interconnected network (e.g., truss, structure, etc.) of stiffening ribs 64. An outer peripheral boundary of each aperture 58 is formed by a grouping of the stiffening ribs 64; e.g., a subset of the stiffening ribs 64. Each of the stiffening ribs 64 extends within a plane of the apertured plate 42 between opposing ends thereof, where at least one or both of these ends is located at a respective node 66 (e.g., interconnection) with one or more other stiffening ribs 64. Referring to FIG. 3, each of the stiffening ribs 64 is bonded (e.g., brazed and/or welded) to the respective base sheet base section 38 at its second side surface 46. Each of the stiffening ribs 64 of FIG. 3 projects vertically out from the respective base sheet base section 38 and its second side surface 46 to the second side surface 52 of the apertured plate 42 and/or the panel second side 36.

Referring to FIG. 2, the respective component panel 22 may also be configured with a frame 68; e.g., a border. This frame 68 may extend at least partially or completely about an outer periphery of the interconnected network of the stiffening ribs 64. Referring to FIG. 3, the frame 68 may also or alternatively be bonded (e.g., brazed and/or welded) to the respective base sheet base section 38 at its second side surface 46. The frame 68 of FIG. 3 projects vertically out from the respective base sheet base section 38 and its second side surface 46 to the second side surface 52 of the apertured plate 42 and/or the panel second side 36.

Figure 5:
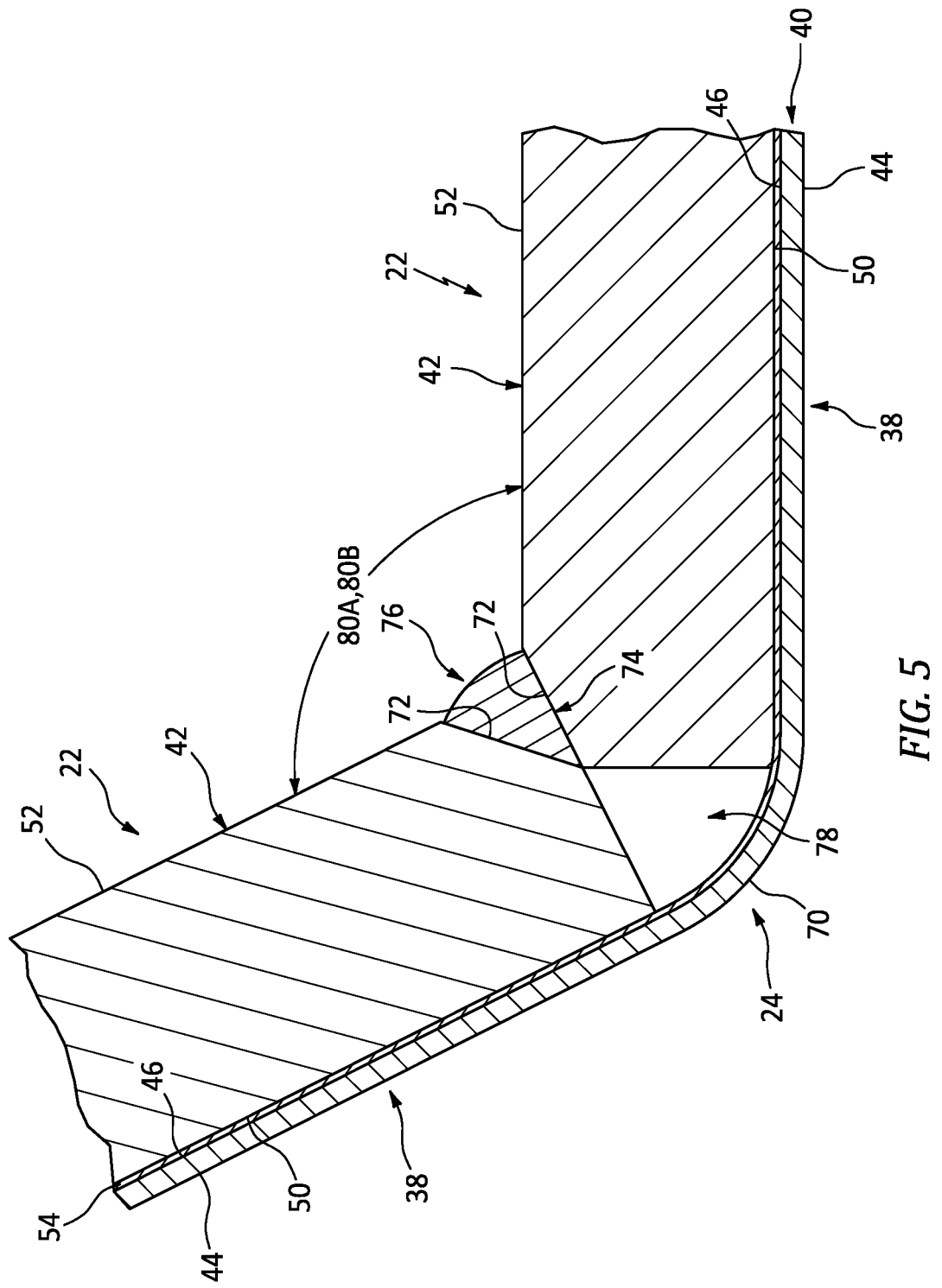
FIG. 5 is a sectional illustration of a portion of the component at a bend between laterally neighboring component panels.

The base sheet 40 of FIG. 1 includes one or more intermediate sections 70A and 70B (generally referred to as "70"); e.g., corner sections, bridge sections, coupling sections, etc. Referring to FIG. 5, each intermediate section 70 extends between and is connected to (e.g., formed integral with) a pair of laterally neighboring (e.g., adjacent) base sections 38. Each intermediate section 70 extends longitudinally along (e.g., an entirety of) one or more of the respective base sections 38. The intermediate section 70 of FIG. 5 forms a respective one of the bends 24A, 24B (generally referred to as "24") (e.g., a corner) between the respective pair of laterally neighboring (e.g., adjacent) component panels 22 and its base sections 38. The intermediate section 70 of FIG. 5, for example, extends along a non-straight (e.g., an arcuate, bent, etc.) lateral centerline between and to the respective base sections 38. The base sheet 40 may thereby have a non-straight (e.g., curved, arcuate, partially circular, bent, etc.) sectional geometry at an interface between the respective component panels 22 when viewed, for example, in a plane perpendicular to the respective component panels 22 and their surfaces 44, 46, 50 and/or 52.

The apertured plates 42 of the respective component panels 22 of FIG. 5 are connected (e.g., bonded) together at the bend 24. Each apertured plate 42 of FIG. 5, for example, is configured with a chamfered or otherwise eased edge 72A, 72B (generally referred to as "72"); see also dashed lines in FIGS. 2 and 3. These laterally neighboring (e.g., adjacent) chamfered edges 72 are laterally abutted against one another, or otherwise positioned proximate one another. The chamfered edges 72 provide a (e.g., V-shaped) notch 74 along the respective apertured plates 42, which notch 74 may receive bonding material 76 (e.g., a bead of weld) for bonding (e.g., welding) the respective apertured plates 42 together; see also FIG. 1.

With the foregoing arrangement, laterally neighboring apertured plates 42 are structurally tied together via the bonding material 76 laterally therebetween. Thus, a load path extends laterally between the laterally neighboring apertured plates 42 through the bonding material 76. Similarly, laterally neighboring base sections 38 of the base sheet 40 are structurally tied together via the respective intermediate section 70 laterally therebetween. Thus, a load path extends laterally between the laterally neighboring base sheet base sections 38 through the base sheet intermediate section 70. These multiple lateral load paths may increase the structural stiffness of the component 20.

The base sheet intermediate section 70 of FIG. 5 is vertically separated from the respective apertured plates 42 and their respective ends. The intermediate section 70 is also vertically separated from the bonding material 76. A channel 78, for example, is formed within the component 20 at the bend 24. This channel 78 extends vertically from the intermediate section 70 to the respective apertured plates 42. The channel 78 extends laterally between and to the respective apertured plates 42. The channel 78 extends longitudinally within (and through) the component 20 and along the bend 24.

The channel 78 of FIG. 5 has a sectional geometry when viewed, for example, in a plane perpendicular to the respective component panels 22 and their surfaces 44, 46, 50 and/or 52. The sectional geometry of FIG. 5 has a circular sector shape; however, the present disclosure is not limited to such an exemplary sectional geometry. For example, in other embodiments, the sectional geometry may be more triangular.

With the arrangement of FIG. 1, the intermediate component panel 22A is angularly offset from the first side component panel 22B by an included angle 80A. This included angle 80A may be an obtuse angle, or a right angle. The included angle 80A, for example, may be greater than ninety degrees (>90°) and less than one-hundred and eighty degrees (<180°); e.g., between ninety-five degrees (95°) and one-hundred and twenty degrees (120°), or between one-hundred and twenty degrees (120°) and one-hundred and fifty degrees (150°), or between one-hundred and fifty degrees (150°) and one-hundred and seventy-five degrees (175°). Alternatively, the included angle 80A may be equal to ninety degrees (90°). The present disclosure, however, is not limited to such an exemplary arrangement.

The intermediate component panel 22A is angularly offset from the second side component panel 22C by an included angle 80B, which may be equal to or different than the included angle 80A. This included angle 80B may be an obtuse angle, or a right angle. The included angle 80B, for example, may be greater than ninety degrees (>90°) and less than one-hundred and eighty degrees (<180°); e.g., between ninety-five degrees (95°) and one-hundred and twenty degrees (120°), or between one-hundred and twenty degrees (120°) and one-hundred and fifty degrees (150°), or between one-hundred and fifty degrees (150°) and one-hundred and seventy-five degrees (175°). Alternatively, the included angle 80B may be equal to ninety degrees (90°). The present disclosure, however, is not limited to such an exemplary arrangement.

Figure 6:
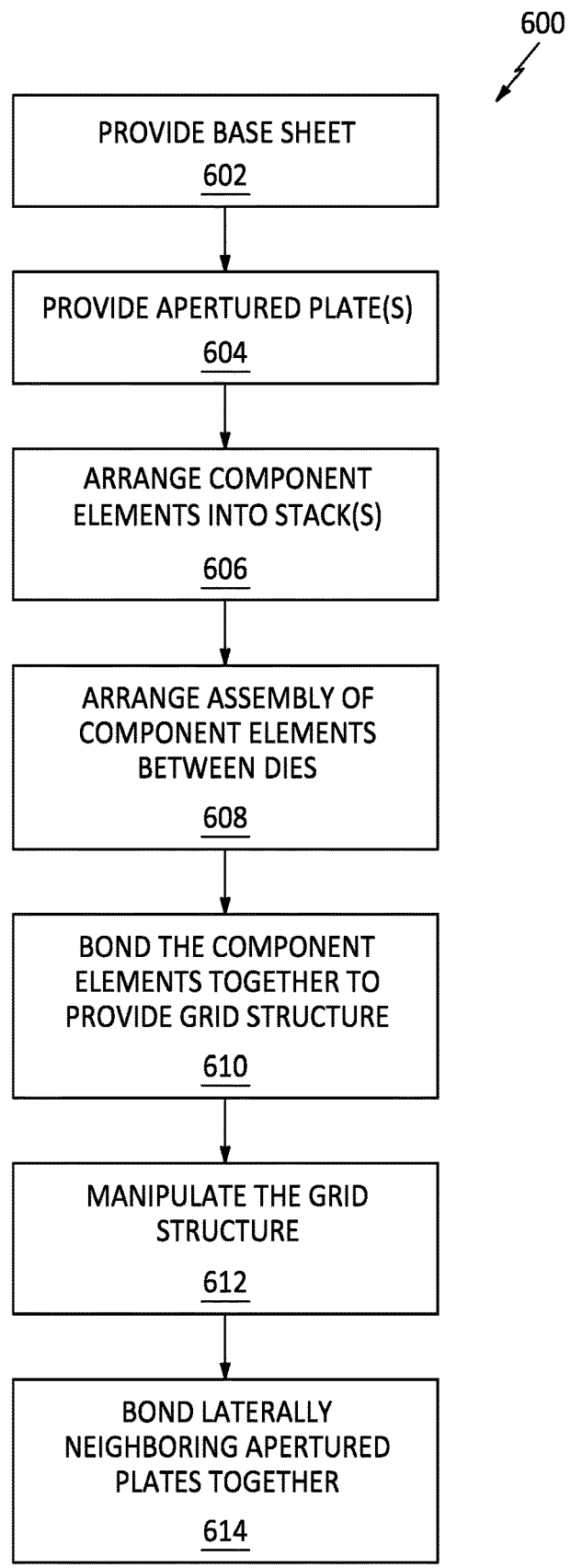
FIG. 6 is a flow diagram of a method for manufacturing a component.

FIG. 6 is a flow diagram of a method 600 for manufacturing a component. For ease of description, this component is described below with reference to the component 20 described above. The method 600 of the present disclosure, however, is not limited to manufacturing such an exemplary component. Furthermore, the component 20 described above is not limited to being manufactured by the method 600.

Figure 7:
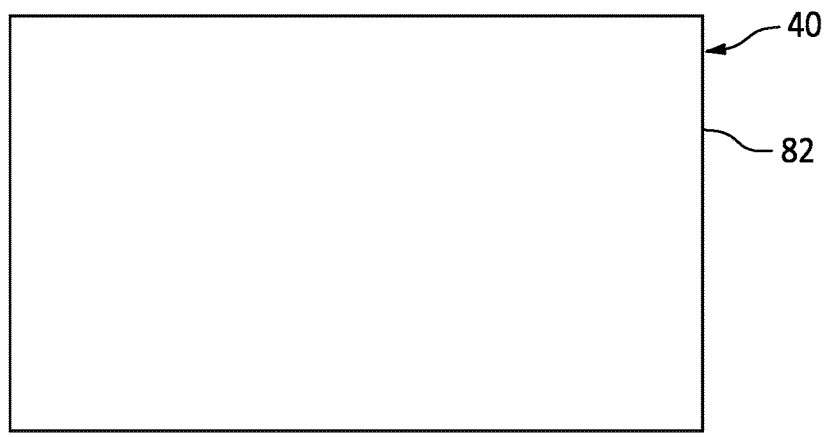
FIG. 7 is an illustration of a non-apertured sheet.

In step 602, the base sheet 40 is provided. For example, referring to FIG. 7, a sheet of material 82 (e.g., sheet metal) may be cut (e.g., trimmed) to size to provide the base sheet 40. Alternatively, the base sheet 40 may be machined and/or otherwise formed.

Figure 8A:
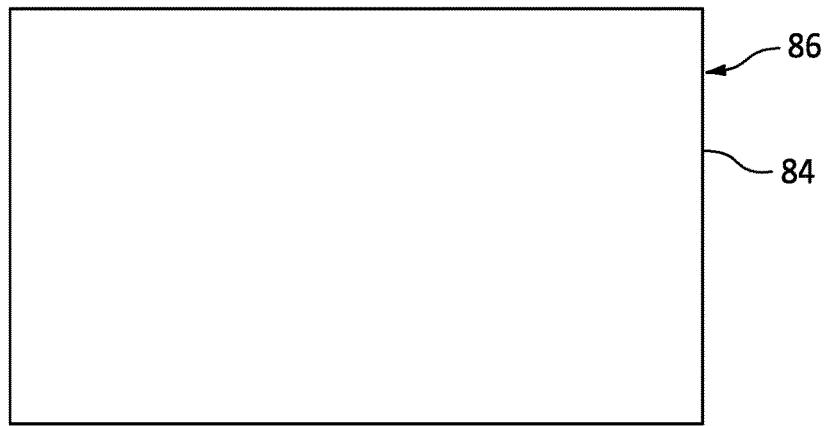
FIGS. 8A and 8B illustrate a sequence for forming an apertured plate.

In step 604, one or more apertured plates 42 are provided. For example, referring to FIG. 8A, a sheet of material 84 (e.g., sheet metal or metal plate) may be cut (e.g., trimmed) to size to provide a base plate 86; e.g., non-apertured plate in FIG. 8A. Alternatively, the base plate 86 may be cast, machined and/or otherwise formed.

Figure 8B:
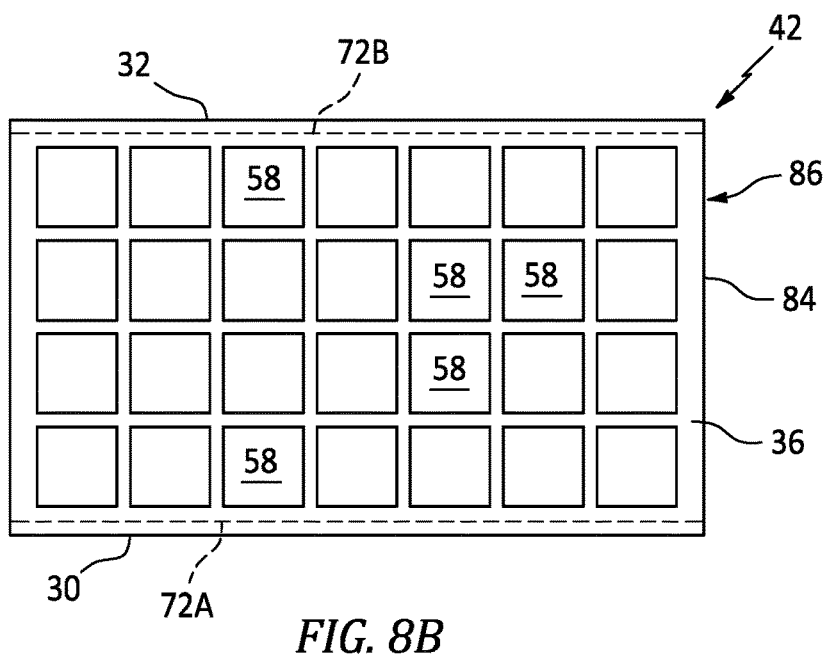

Referring to FIG. 8B, the apertures 58 are formed in the base plate 86 to provide a respective one of the apertured plates 42. The apertures 58, for example, may be machined (e.g., cut) into the base plate 86 using one or more machining tools. Examples of the machining tools include, but are not limited to, a water jet machining device, an energy (e.g., laser or electron) beam machining device and a machining mill. Alternatively, the apertured plate 42 may be cast and/or otherwise formed.

One or more of the panel lateral ends 30, 32 may be chamfered or otherwise eased to provide the chamfered edge(s) 72A, 72B (see also FIG. 3). Edges between the panel lateral end 30, 32 and the panel second side 36, for example, may be machined to form the chamfered edge(s) 72A, 72B.

Figure 9A:
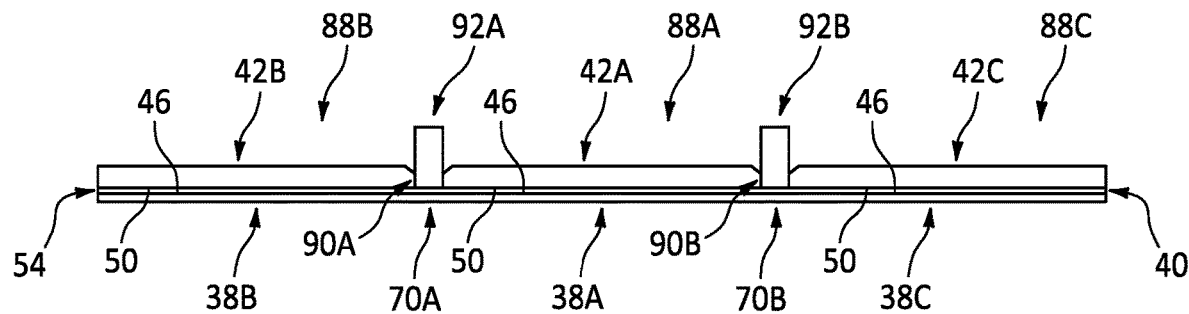
FIGS. 9A and 9B illustrate a sequence for arranging elements of the component together.
Figure 10A:
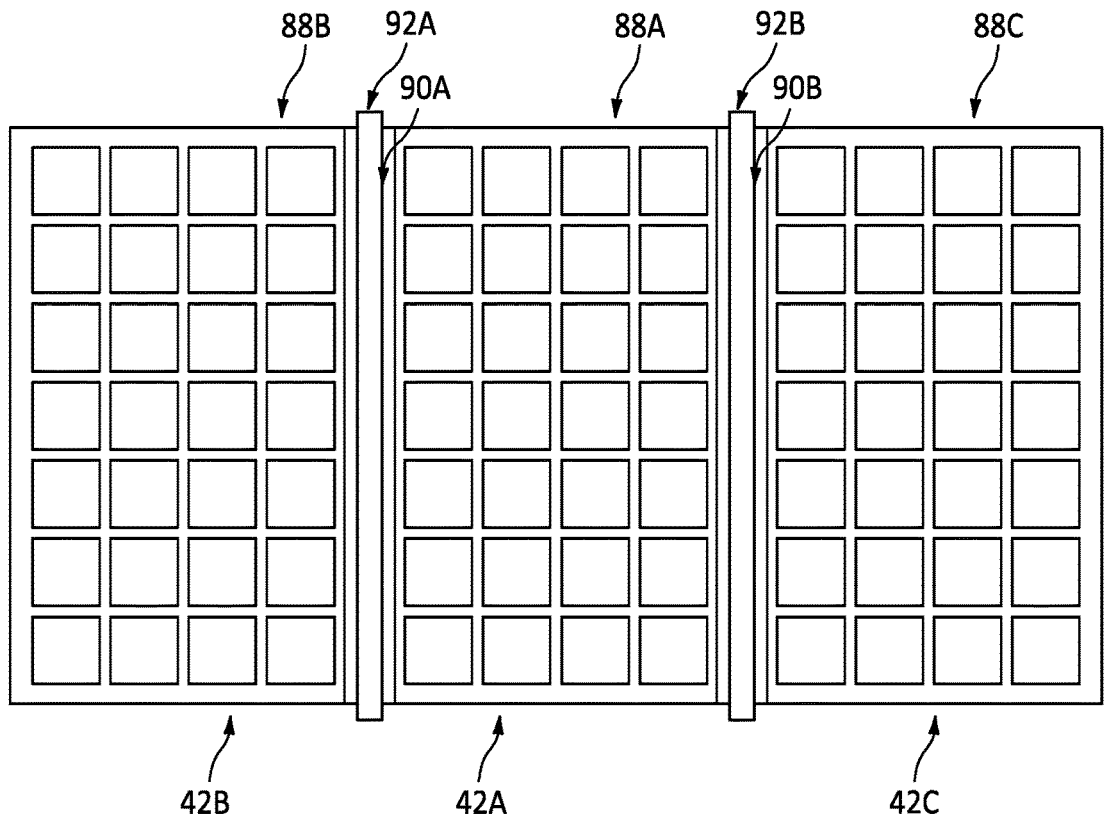
FIGS. 10A and 10B further illustrate the sequence for arranging elements of the component together.

In step 606, the component elements 38, 40, 42 and 54 are arranged together to provide one or more stacks 88A-C (generally referred to as "88"). Referring to FIGS. 9A and 10A, each of these stacks 88 may include the component elements 38, 40, 42 and 54.

Referring to FIG. 9A, the bonding material 54 (e.g., brazing foil) is arranged with the base sheet 40. The bonding material 54 of FIG. 9A, for example, may be laid (e.g., flat) against the base sheet 40 and each of its sections 38/second side surfaces 46; at this stage of the method 600, the surfaces 46 may collectively form a single flat surface of the base sheet 40.

The one or more apertured plates 42 are arranged with the base sheet 40. Each of the apertured plates 42 of FIGS. 9A and 10A, for example, is disposed (e.g., placed) on top of the base sheet 40 and a respective one of the base sections 38/second side surfaces 46. More particularly, each apertured plate 42 may be disposed on top of the bonding material 54 of FIG. 9A, where the bonding material 54 is vertically between and engages (e.g., contacts) the respective base section 38 and the respective apertured plate 42.

Figure 9B:
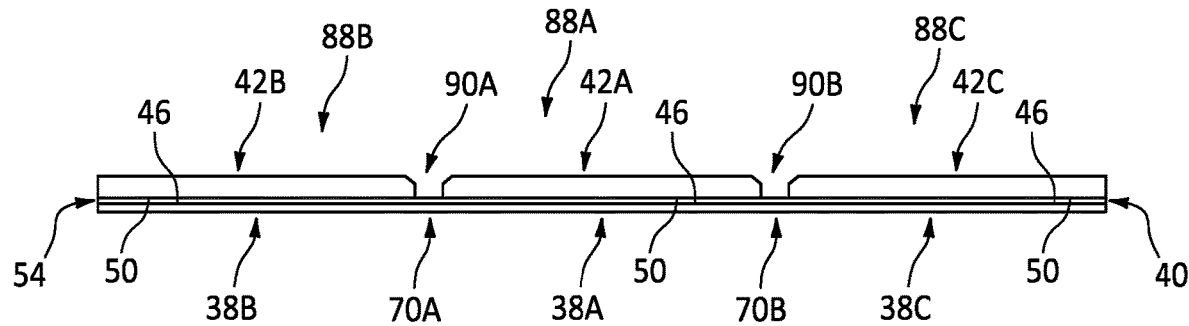
Figure 10B:
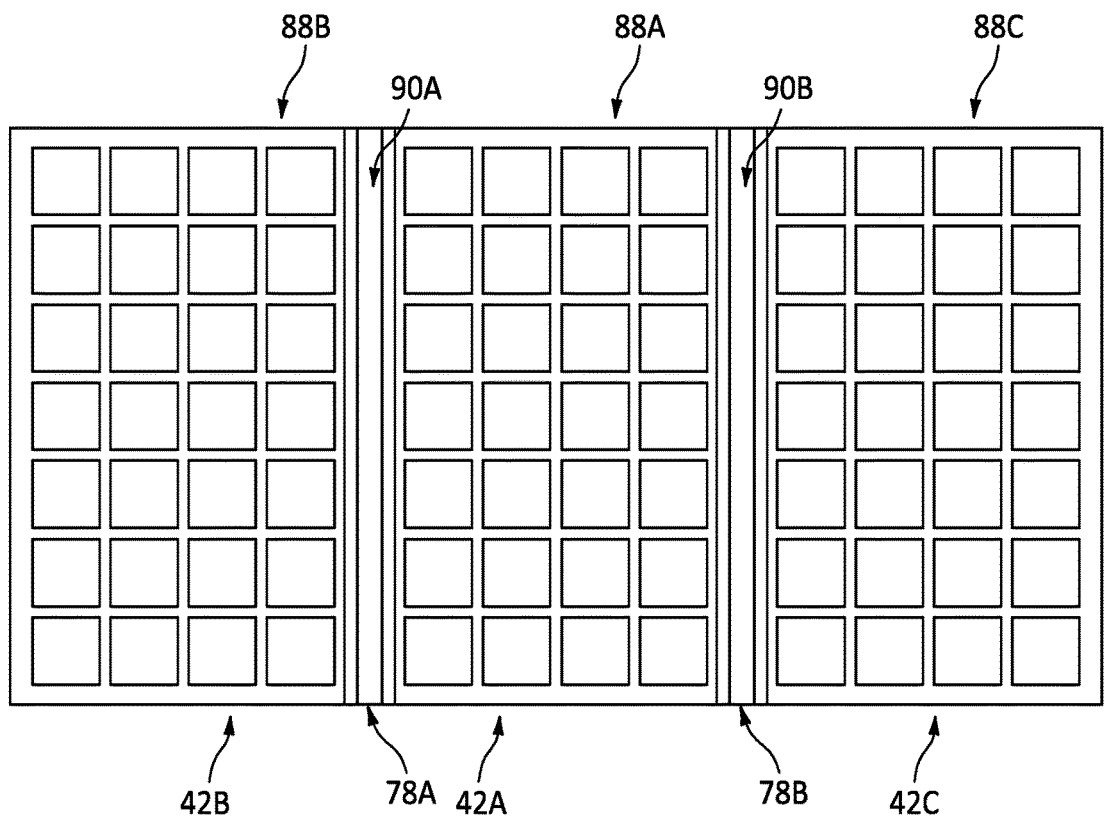

The apertured plates 42 of FIGS. 9A and 10A are spaced from one another by gaps 90A and 90B (generally referred to as "90"); see also FIGS. 9B and 10B. These gaps 90 may be established using one or more spacers 92A and 92B (generally referred to as "92"); e.g., a block, a strip of material, etc. Each spacer 92 of FIGS. 9A and 10A, for example, is disposed laterally between a respective pair of laterally neighboring apertured plates 42. Each spacer 92 may be abutted laterally against the respective apertured plates 42.

To maintain this arrangement of the component elements 38, 40, 42 and 54, one or more of the apertured plates 42 may be welded to the base sheet 40 and its respective base section 38. Each apertured plate 42, for example, may be spot or tack welded (e.g., resistance welded) to the respective base sheet base section 38 there-beneath. Following this arrangement of the apertured plates 42 (and the welding of the apertured plates 42), the spacers 92 may be removed to provide an assembly of the component elements 38, 40, 42, 54 and 70 as shown, for example, in FIGS. 9B and 10B. Of course, in other embodiments, it is contemplated the spacers 92 may be removed at another point during the method 600; e.g., just prior to the welding of the apertured plates 42 to the base sheet 40, etc.

Figure 11:
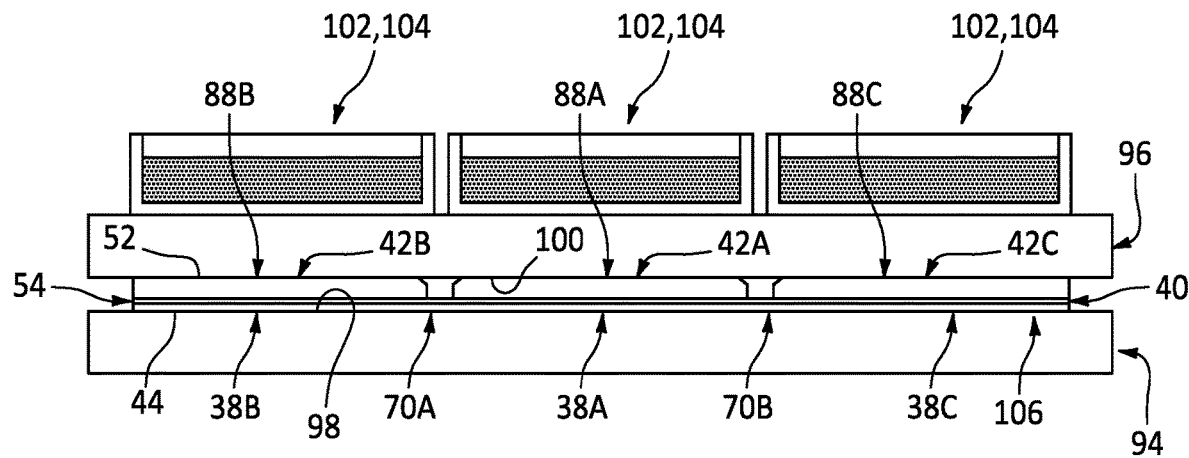
FIG. 11 is a sectional illustration of an assembly of component elements arranged within a die assembly for bonding the component elements together.

In step 608, the assembly of component elements 38, 40, 42, 54 and 70 are arranged between a lower die 94 (e.g., a graphite tooling plate) and at least one upper die 96 (e.g., a graphite tooling plate). For example, referring to FIG. 11, the assembly of component elements 38, 40, 42, 54 and 70 is disposed on a top surface 98 of the lower die 94. A bottom surface 100 of the upper die 96 is disposed on the apertured plates 42 and their second side surfaces 52. Each stack 88 may thereby be positioned vertically between and vertically engaged with (e.g., contact) the lower die top surface 98 and the upper die bottom surface 100. Each stack 88 may also be pressed (e.g., clamped) vertically between the lower die 94 and its top surface 98 and the upper die 96 and its bottom surface 100. The lower die 94 and the upper die 96 may thereby facilitate (e.g., full) contact between the assembly of component elements 38, 40 and 42 for bonding.

In some embodiments, static weight of the upper die 96 may be suitable to apply enough pressure to the assembly of component elements 38, 40 and 42 for the bonding. However, in other embodiments, the upper die 96 may be pushed downward using one or more other devices 102. For example, one or more additional static weights 104 (e.g., containers of metal particles; e.g., tungsten pellets) may be placed on top of the upper die 96. The present disclosure, however, is not limited to such exemplary devices.

In step 610, the assembly of component elements 38, 40 and 42 are concurrently bonded together to form a multi-grid structure 106; e.g., a flat preform of the component 20. The assembly of component elements 38, 40, 42 and 54 while pressed between the lower die 94 and the upper die 96, for example, may be exposed to an elevated temperature during a furnace cycle. This elevated temperature may melt the bonding material 54. Upon cooling, the bonding material 54 may bond the various component elements 38, 40 and 42 together to provide the multi-grid structure 106. An example of such a bonding process is a diffusion bonding process. The present disclosure, however, is not limited to such an exemplary bonding process and could alternatively be a brazing process.

Figure 12:
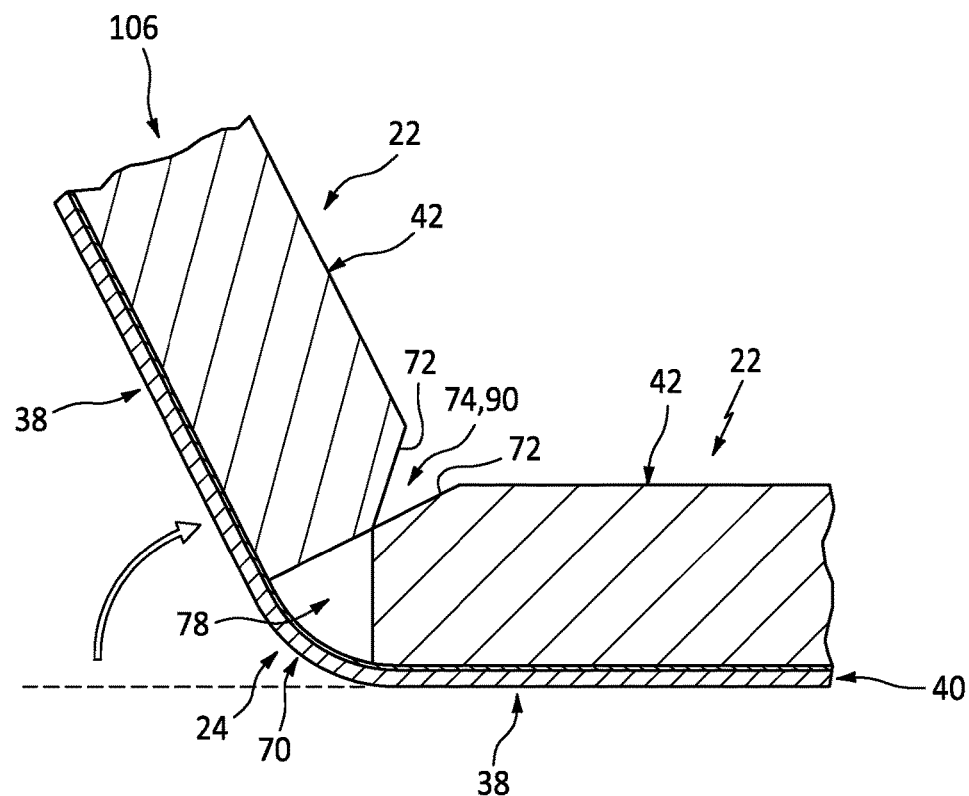
FIG. 12 is a sectional illustration of a portion of the component during formation of the bend between the laterally neighboring component panels.

In step 612, the multi-grid structure 106 is manipulated; e.g., formed. For example, referring to FIG. 12, the multi-grid structure 106 is bent along the gap 90 between each respective pair of the laterally neighboring apertured plates 42. More particularly, the base sheet 40 and its intermediate section 70 is bent (e.g., using a mechanical brake) to form the respective bend 24 between the laterally neighboring component panels 22. The bending may be performed until one of the respective apertured plates 42 engages (e.g., contacts) or is otherwise located proximate the other one of the respective apertured plates 42, thereby leaving the respective notch 74 for the bonding material 76; see FIG. 5.

In step 614, the laterally neighboring apertured plates 42 are bonded together to provide the component 20. For example, referring to FIG. 5, the bonding material 76 (e.g., a bead of weld) may be laid in (and/or about) the notch 74 along the respective chamfered edges 72. Each pair of laterally neighboring apertured plates 42 may thereby be bonded (e.g., welded) together.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A manufacturing method, comprising:
    forming a plurality of first apertures in a first plate to provide an apertured first plate, the apertured first plate comprising first plate metal;
    forming a plurality of second apertures in a second plate to provide an apertured second plate, the apertured second plate comprising second plate metal;
    bonding the apertured first plate and the apertured second plate to a base sheet to form a structure, the base sheet comprising base sheet metal; and
    bending the base sheet to form a bend in the structure between the apertured first plate and the apertured second plate, wherein a channel is formed by and between the base sheet, the apertured first plate and the apertured second plate along the bend in the structure.

2. The manufacturing method of claim 1, wherein the bonding comprises brazing the apertured first plate and the apertured second plate to the base sheet.

3. The manufacturing method of claim 2, further comprising at least one of:
    welding the apertured first plate to the base sheet prior to brazing the apertured first plate to the base sheet; or
    welding the apertured second plate to the base sheet prior to brazing the apertured second plate to the base sheet.

4. The manufacturing method of claim 1, wherein the apertured first plate and the apertured second plate are concurrently bonded to the base sheet.

5. A manufacturing method, comprising:
    forming a plurality of first apertures in a first plate to provide an apertured first plate, the apertured first plate comprising first plate metal;
    forming a plurality of second apertures in a second plate to provide an apertured second plate, the apertured second plate comprising second plate metal;
    arranging the apertured first plate and the apertured second plate with the base sheet, the arranging comprising locating the apertured first plate relative to the apertured second plate using a spacer, and the spacer disposed between and abutted against the apertured first plate and the apertured second plate during the locating;
    bonding the apertured first plate and the apertured second plate to a base sheet to form a structure, the base sheet comprising base sheet metal; and
    bending the base sheet to form a bend in the structure between the apertured first plate and the apertured second plate.

6. The manufacturing method of claim 5, further comprising removing the spacer prior to the bonding.

7. The manufacturing method of claim 1, further comprising welding the apertured first plate to the apertured second plate following the bending of the base sheet.

8. The manufacturing method of claim 1, further comprising bonding a chamfered first edge of the apertured first plate to a chamfered second edge of the apertured second plate following the bending of the base sheet.

9. The manufacturing method of claim 1, wherein at least one of
    the forming of the plurality of first apertures comprises machining the plurality of first apertures into the first plate; or
    the forming of the plurality of second apertures comprises machining the plurality of second apertures into the second plate.

10. The manufacturing method of claim 1, further comprising:
    arranging bonding material between the apertured first plate and the base sheet and between the apertured second plate and the base sheet to provide one or more stacks; and
    pressing the one or more stacks between a first die and a second die during the bonding.

11. The manufacturing method of claim 1, wherein the apertured first plate is angularly offset from the apertured second plate by an angle equal to or greater than ninety degrees and less than one-hundred and eighty degrees.

12. The manufacturing method of claim 1, wherein at least one of
    the apertured first plate and the base sheet form a first orthogrid structure; and
    the apertured second plate and the base sheet form a second orthogrid structure.

13. The manufacturing method of claim 1, wherein at least one of a first of the plurality of first apertures comprises a polygonal cross-sectional geometry; or a first of the plurality of second apertures comprises a polygonal cross-sectional geometry.

14. A manufacturing method, comprising:

forming a plurality of first apertures in a first plate to provide an apertured first plate, the apertured first plate comprising first plate metal;

forming a plurality of second apertures in a second plate to provide an apertured second plate, the apertured second plate comprising second plate metal;

bonding the apertured first plate and the apertured second plate to a base sheet to form a structure, the base sheet comprising base sheet metal; and bending the base sheet to form a bend in the structure between the apertured first plate and the apertured second plate;

wherein the structure comprises a base, a plurality of first stiffening ribs and a plurality of second stiffening ribs;

wherein the base is formed by the base sheet;

wherein the plurality of first stiffening ribs are connected to and project out from the base, and the plurality of first stiffening ribs are arranged in a first interconnected network that is formed by the apertured first plate; and wherein the plurality of second stiffening ribs are connected to and project out from the base, and the plurality of second stiffening ribs are arranged in a second interconnected network that is formed by the apertured second plate.

15. A manufacturing method, comprising:

forming a plurality of first apertures in a first plate to provide an apertured first plate, the apertured first plate comprising first plate metal;

forming a plurality of second apertures in a second plate to provide an apertured second plate, the apertured second plate comprising second plate metal;

forming a plurality of third apertures in a third plate to provide an apertured third plate, the apertured third plate comprising third plate metal;

bonding the apertured first plate and the apertured second plate to a base sheet to form a structure, the base sheet comprising base sheet metal;

further bonding the apertured third plate to the base sheet to form the structure;

bending the base sheet to form a bend in the structure between the apertured first plate and the apertured second plate; and bending the base sheet to form a second bend in the structure between the apertured second plate and the apertured third plate.

* * * * *